United States Patent [19]
Nakajima

[11] Patent Number: 6,052,211
[45] Date of Patent: *Apr. 18, 2000

[54] COMPACT MULTIPLE-BEAM SCANNING OPTICAL SYSTEM

[75] Inventor: Tomohiro Nakajima, Machida, Japan

[73] Assignee: Ricoh Company, Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/898,267

[22] Filed: Jul. 22, 1997

[30] Foreign Application Priority Data

Jul. 22, 1996 [JP] Japan ................................. 8-192290
Sep. 17, 1996 [JP] Japan ................................. 8-244372
Jun. 27, 1997 [JP] Japan ................................. 9-171611

[51] Int. Cl.$^7$ ..................................................... G02B 26/08
[52] U.S. Cl. ........................ 359/204; 359/201; 359/203; 359/208; 347/235; 347/243
[58] Field of Search .................... 359/201, 203, 359/204, 208; 347/134, 137, 233, 235, 241, 243

[56] References Cited

U.S. PATENT DOCUMENTS

| | | | |
|---|---|---|---|
| 3,646,568 | 2/1972 | Woywood | 359/203 |
| 4,537,465 | 8/1985 | Sherman et al. | 359/204 |
| 5,251,055 | 10/1993 | Koide | 359/204 |
| 5,512,949 | 4/1996 | Fisli et al. | 359/204 |
| 5,715,078 | 2/1998 | Shiraishi | 359/204 |

FOREIGN PATENT DOCUMENTS

2-250020 10/1990 Japan .
4-127115 4/1992 Japan .

*Primary Examiner*—Darren E. Schuberg
*Attorney, Agent, or Firm*—Knoble & Yoshida LLC

[57] ABSTRACT

A method of arranging scanning optical components is described to provide a compact scanning optical system which includes a plurality of light sources for simultaneously emitting multiple image-forming beams towards a common image-reflecting surface such as a polygon mirror via an image-focusing element such as a set of vertically layered fθ mirrors.

39 Claims, 8 Drawing Sheets

COMPACT MULTIPLE-BEAM SCANNING OPTICAL SYSTEM

FIELD OF THE INVENTION

The current invention is generally related to a method of and a system for providing a compact optical system and more particularly related to a method of arranging scanning optical components in a compact space and a compact optical system having a plurality of light sources for simultaneously emitting multiple image-forming beams towards an image-focusing element such as a focusing mirror via a rotatable image-reflecting surface such as a polygon mirror.

BACKGROUND OF THE INVENTION

An optical system is used in image duplication devices such as facsimile machines, copiers and printers. In general, the optical system is housed in a single housing unit and is located near an intermediate image-forming surface such as a photoreceptor drum. The optical system includes an image-forming light source, an image-reflecting surface and an image-focusing element to form a desired image on the intermediate or temporary image-forming surface by repeatedly scanning the image-forming light beam in a predetermined direction. To accomplish an efficient scanning, the image-reflecting surface has multiple reflecting surfaces and is rotated at a high speed. The light source emits an image-forming light beam and is located at a certain distance from the rotatable reflecting surface at a predetermined angle so that a desired scanning angle is obtained. For these and other reasons, the above described prior art optical housing unit generally takes a certain amount of space.

For color image duplication, the light source generally includes multiple image-forming beams each representing a color component such as cyan, magenta, yellow and black. Relevant prior art references illustrate certain spacial arrangements of the above described components in a multi-beam scanning system. For example, Japanese Patent Laid Open Application 4-127115 discloses that a set of the above described multiple image-forming beams is independently scanned by a common polygon mirror and that the reflected image-forming beams respectively form portions of a desired image via a set of image-focusing lenses.

Figure 1:
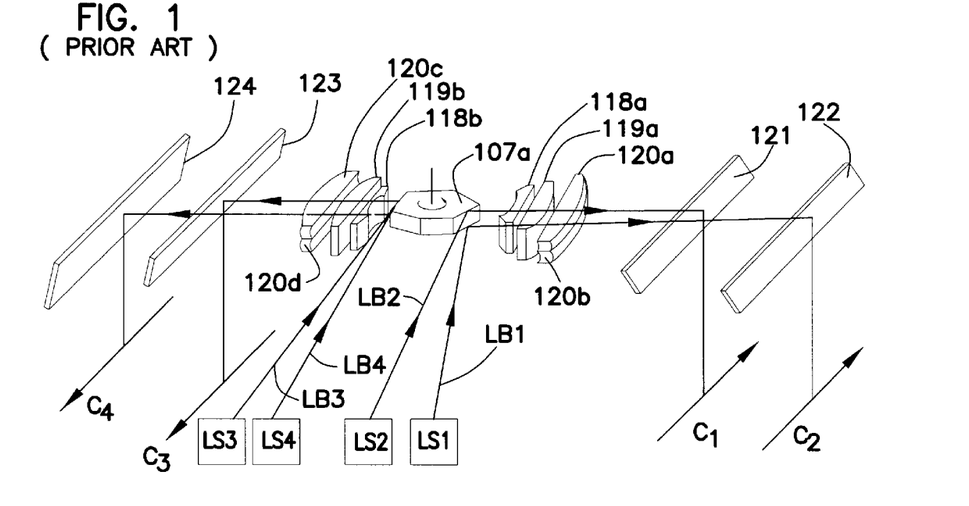
FIG. 1 is a perspective view illustrating certain components of a conventional multiple-beam scanning system.

Referring to FIG. 1, Japanese Patent Laid Open Application 2-250020 discloses that an optical scanning system includes a set of light sources LS1 through LS4, and each light source emits an image-forming light beam towards a common polygon mirror 107a. The light beams LB1 and LB2 are reflected and scanned by a first reflecting surface of the polygon mirror 107a while the light beams LB3 and LB4 are reflected and scanned by a second reflecting surface of the polygon mirror 107a. The reflected beams LB1 and LB2 are focused by a series of lenses 118a, 119a, 120a and 120b, and the focused images are then redirected downwardly by a pair of mirrors 121 and 122 for scanning the focused images in predetermined directions C1 and C2 on a respective temporary image-forming surface. Similarly, the reflected beams LB3 and LB4 are focused by a series of lenses 118b, 119b, 120c and 120d, and the focused images are then redirected downwardly by a pair of mirrors 123 and 124 for scanning the focused images in predetermined directions C3 and C4 on a respective temporary image-forming surface. A first group of cylindrical lenses 118a, 118b, 119a and 119b has refractive power only in a scanning direction as indicated in C1, C2, C3 or C4 while a second group of lenses 120a, 120b, 120c and 120d has refractive power in the scanning direction as well as in a sub-scanning direction which is perpendicular to the scanning direction. As a result, the desired image is initially formed behind or further away from the lenses and the polygon mirror.

Figure 2:
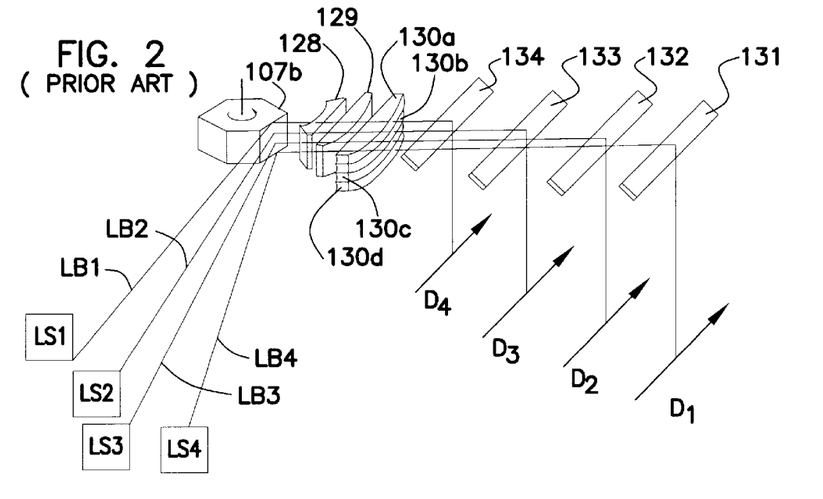
FIG. 2 is a perspective view illustrating certain components of another conventional multiple-beam scanning system.

Referring to FIG. 2, Japanese Patent Laid Open Application 2-250020 also discloses that an optical scanning system includes a set of light sources LS1 through LS4, and each light source emits an image-forming light beam towards a common polygon mirror 107b. The light beams LB1 through LB4 are reflected and scanned by a common reflecting surface of a polygon mirror 107b. The reflected beams LB1 through LB4 are focused by a series of lenses 128, 129, 130a, 130b, 130c and 130d, and the focused images are then redirected downwardly by a mirror 131, 132, 133 and 134 for scanning the images in predetermined directions D1, D2, D3 and D4 on a respective temporary image-forming surface. A first group of cylindrical lenses 128 and 129 has refractive power only in a scanning direction as indicated by arrows D1, D2, D3 and D4 while a second group of anamorphic lenses 130a, 130b, 130c and 130d has refractive power both in the scanning as well as sub-scanning directions. As a result, the desired images are initially formed behind or further away from the lenses and the polygon mirror. Since each image is formed further away from the polygon mirror, the above described prior art optical scanning system requires a certain overall dimension and fails to reduce its size.

In addition, the above arrangement also fails to reduce the polygon mirror size. Since the above described second groups of the vertically layered lenses require a certain distance between the centers of the lenses, the image-forming light beams also need to be separated at least by the same vertical distance in the neighborhood of 10 mm. Due to the minimal vertical distance between the light beams, the thickness of the polygon mirror cannot be reduced beyond the above described beam separation distance. The polygon mirror thickness is also positively related to a size of a motor to rotate the polygon mirror at a predetermined high rotational speed. In other words, the larger the polygon mirror is, the larger the motor size is.

In the efforts to manufacture compact duplication devices, the above described optical system needs to be reduced in size. The compact optical system may be achieved by reducing the optical scanning housing unit and or a polygon mirror.

Furthermore, in the efforts to maintain the accuracy of the scanning operation performed by the above described optical scanning system, the scanning operation must be monitored and adjusted so that a desired image is formed by the simultaneously emitted and processed multiple image-forming light beams.

SUMMARY OF THE INVENTION

In order to solve the above and other problems, according to one aspect of the current invention, a method of scanning a plurality of image-forming light beams respectively onto one of predetermined temporary image-forming surfaces via at least a rotatable image-reflecting surface and a reflective image-focusing element, including the following the steps of: a) emitting the plurality of the image-forming light beams towards the rotatable image-reflecting surface; b) rotating the image-reflecting surface so as to scan the image-forming light beams in a predetermined scanning direction as they are reflected towards the predetermined reflective image-focusing element; c) simultaneously forming independent portions of an image after the step b) as the image-forming light beams are reflected off the reflective image-focusing element towards the image-reflecting surface in the scanning direction; and d) directing the image-forming light beams which now forms the image towards the one of the predetermined temporary image-forming surfaces in the scanning direction.

According to a second aspect of the current invention, a method of simultaneously scanning a plurality of image-forming light beams for forming a image via a rotatable narrow polygon mirror and a layered image-focusing mirror, including the following steps of: a) juxtaposing a predetermined number of image-focusing mirrors in layers to form the layered image-focusing mirror; b) simultaneously emitting the plurality of the image-forming light beams with a predetermined substantially short distance between the image-forming light beams towards the rotatable narrow polygon mirror; c) rotating the rotable narrow polygon mirror for scanning each of the image-forming light beams in a predetermined scanning direction; and d) simultaneously forming independent portions of an image after the step c) as the image-forming light beams are reflected off a corresponding one of the layers of the layered image-focusing mirror.

According to a third aspect of the current invention, an optical scanning system for scanning a plurality of image-forming light beams, including: a plurality of light sources for emitting image-forming light beams; a rotatable image-reflecting unit having image-reflecting surfaces located near the light sources for scanning the image-forming light beams in a predetermined scanning direction as the image-forming light beams are reflected off one of the reflecting surfaces; a reflective image-focusing element located near the rotatable image-reflecting unit for simultaneously forming independent portions of an image in response to the image-forming light beams scanned by the rotatable image-reflecting unit, the image-forming light beams being reflected back towards the rotatable image-reflecting unit in the scanning direction; and a set of optical directing elements located between the rotatable image-reflecting unit and the reflective image-focusing element for directing the image-forming light beams which now forms the image respectively towards a predetermined direction.

According to a fourth aspect of the current invention, an image-forming device for a plurality of image-forming scanning light beams for forming a common image, including: a predetermined number of image-focusing mirrors juxtaposed in layers, each of the image-focusing mirrors having a first reflective surface and independently forming a portion of the common image as a corresponding one of the image-forming scanning light beams is reflected off the first reflective surface, the image-forming light beams have a predetermined substantially short distance between the image-forming light beams.

According to a fifth aspect of the current invention, a compact polygon mirror used in an optical scanning system for simultaneously scanning a plurality of image-forming light beams, including: a predetermined number of reflecting surfaces, each of the reflecting surfaces further comprising at least two horizontal portions, the two horizontal portions being angled at a predetermined angle with each other.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 3:
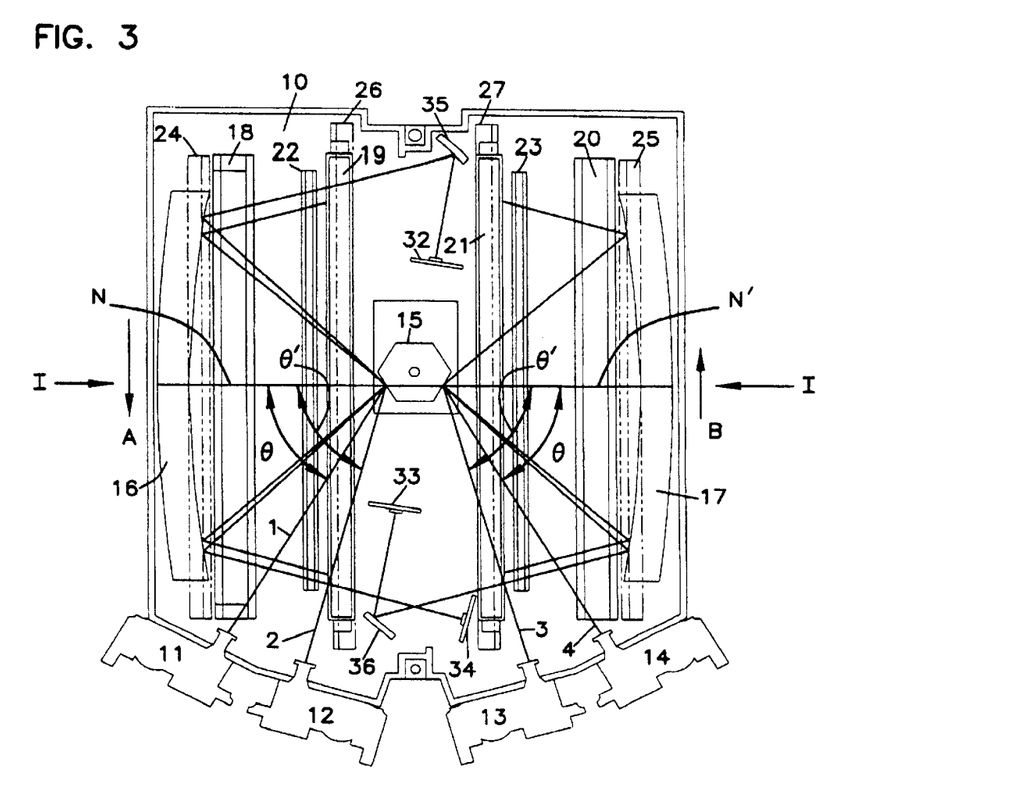
FIG. 3 is a top view illustrating one preferred embodiment of the compact multiple beam scanning system according to the current invention.

Referring now to the drawings, wherein like reference numerals designate corresponding structure throughout the views, and referring in particular to FIG. 3, a top view of one preferred embodiment of the multiple beam scanning system is illustrated. A set of light source units 11 through 14 is located along one side of a scanning housing unit 10, and each of the light source units 11 through 14 emits a corresponding one of image-forming light beams 1 through 4 towards a rotatable light-reflecting surface or a rotatable polygon mirror 15. According to the preferred embodiment, the image-forming light beams 1 through 4 each represent one of predetermined color components such as cyan, magenta, yellow and black in order to form a desired image. The image-forming light beams 1 and 4 enter the polygon mirror surface at a predetermined angle θ with respect to a respective one of normal lines N and N' of reflective image-focusing elements 16 and 17. On the other hand, the image-forming light beams 2 and 3 enter the polygon mirror surface at another predetermined angle θ with respect to the respective one of the normal lines N and N' of the image-forming elements 16 and 17. According to one preferred embodiment, the first predetermined angle θ is approximately 60° while the second predetermined angle θ' is approximately 75°.

The image-forming light beams 1–4 are respectively reflected by the polygon mirror 15 which is rotating at a predetermined high rotational speed in a counter clockwise direction as indicated by an arrow. The reflected light beams are scanned in a predetermined scanning direction. In the first preferred embodiment, the polygon mirror 15 has approximately 6 mm in thickness for the two light beams or approximately 3 mm thickness for each light beam in order to maintain sufficient structural rigidity during rotation. Although a single common polygon mirror is shared among multiple light beams in the above preferred embodiment, in an alternative embodiment, a plurality of a rotatable polygon mirrors may be used for an independent set of the multiple light beams. The reflected light beams 1 and 2 are scanned in a scanning direction as indicated by an arrow A while the reflected light beams 3 and 4 are scanned in an opposite scanning direction as indicated by an arrow B. The scanning beams 1 through 4 are then focused to form a portion of an image as they are focused and reflected by a corresponding one of the reflective image-focusing elements 16 and 17 which are elongated and curved in the scanning direction.

Still referring to FIG. 3, a beginning and an ending of a scanning cycle of the beams are detected by a set of photo sensors 32, 33 and 34. In particular, the photo sensor 32 detects an onset of a scanning cycle for the image-forming light beams 1 and 2 when the light beam 1 is reflected at one end of the reflective image-focusing element 16 and reaches the photo sensor 32 via a redirecting mirror 35. Similarly, the photo sensor 34 detects an end of the scanning cycle for the image-forming light beams 1 and 2 when the light beam 2 is reflected at the other end of the reflective image-focusing element 16 and reaches the photo sensor 34. On the other hand, the photo sensor 33 detects an onset of a scanning cycle for the image-forming light beams 3 and 4 when the light beam 3 is reflected at one end of the reflective image-focusing element 17 and reaches the photo sensor 33 via a redirecting mirror 36.

Figure 4:
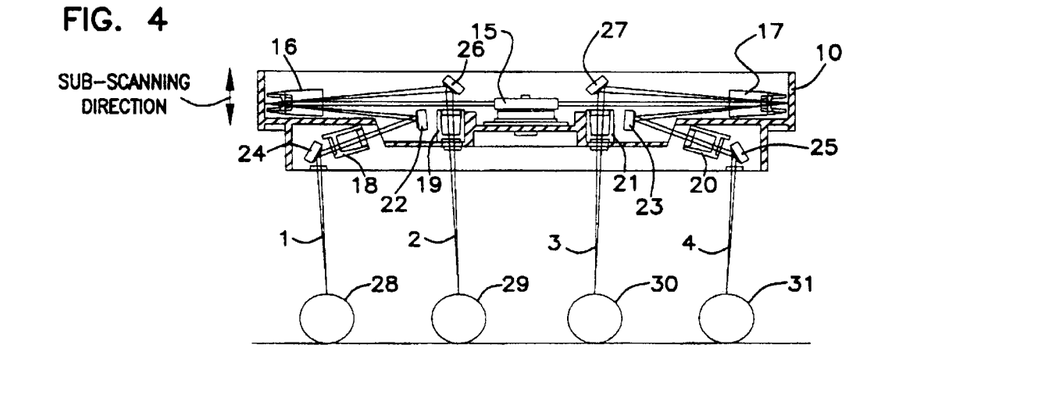
FIG. 4 is a cross sectional view taken at I—I of the preferred embodiment of the compact multiple beam scanning system as shown in FIG. 3.

Now referring to FIG. 4, a cross sectional view of the above described preferred embodiment is taken at a line I—I as illustrated in FIG. 3. The focused image-forming light beams 1 through 4 are respectively redirected by a corresponding one of mirrors 22 through 27 towards a respective one of intermediate image-forming surfaces 28 through 31. The reflective image-focusing element 16 reflects the image forming light beams 1 and 2 in a predetermined direction above an incoming light beam path towards the mirror 26 as well as below the incoming light beam path towards the mirror 22. The reflected light beam 2 is adjusted by a toroidal lens 19 while the reflected light beam 1 is adjusted by a toroidal lens 18 and is further redirected by a second mirror 24. Similarly, the reflective image-focusing element 17 reflects the image forming light beams 3 and 4 in a predetermined direction above an incoming light beam path towards the mirror 27 as well as below the incoming light beam path towards the mirror 23. The reflected light beam 3 is adjusted by a toroidal lens 21 while the reflected light beam 4 is adjusted by a toroidal lens and is further redirected by a second mirror 25.

Still referring to FIG. 4, the reflective image-focusing elements 16 and 17 each further include fθ mirrors, and these fθ mirrors are vertically layered for independently reflecting and focusing multiple incoming light beams. In the above described preferred embodiment according to the current invention, the reflective image-focusing elements 16 and 17 each have a two-layered structure which is expanding in a scanning as well as sub-scanning directions. The sub-scanning direction is perpendicular to the scanning direction of the scanning light beams 1 through 4, whose movement is caused by the rotation of a polygon mirror 15. The distance between the two layers of the fθ mirrors is advantageously shorter than conventional image-focusing elements such as cylindrical lenses. Furthermore, each layer reflects the incoming beam at a predetermined angle towards the polygon mirror in the scanning direction. Because of these characteristics of the vertically layered reflective image-focusing elements 16 and 17, the image-forming light beams are emitted at a substantially closer distance with each other.

In the above described preferred embodiment of the multiple beam-scanning system according to the current invention, the optical scanning unit is substantially reduced in size at least in three aspects. Because of the short distance between the two adjacently emitted image-forming light beams, the thickness of a polygon mirror is reduced to approximately 6 mm. Secondly, this size reduction in the polygon mirror also allows a smaller motor to rotate the polygon mirror at a predetermined high rotational speed. In addition to these reduction factors related to the polygon mirror, the above described reflective image-focusing elements or layered fθ mirrors also contribute to the size reduction. The image-focusing elements enables the light beams to form desired images on a plane located between the polygon mirror and the image-focusing elements. Although these images are redirected towards respective intermediate image-forming surfaces, the images are formed closer to the polygon mirror. In sharp contrast, a conventional image-forming element such as cylindrical lenses forms a desired image behind the lenses and away from the polygon mirror. Thus, the housing size of the preferred embodiment is smaller than that of the conventional unit for the multiple beam scanning system.

Figure 5:
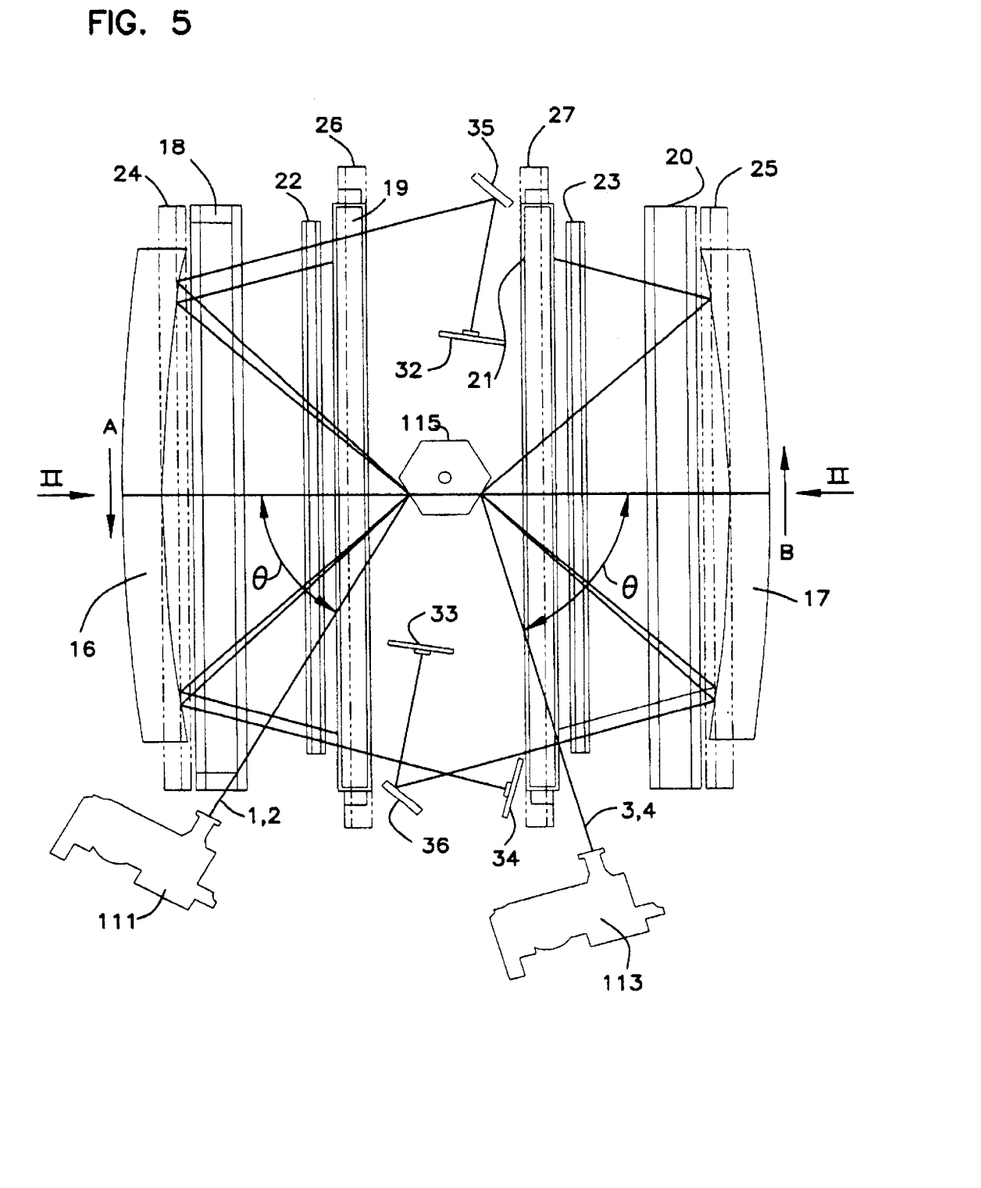
FIG. 5 is a top view illustrating a second preferred embodiment of the compact multiple beam scanning system according to the current invention.

Referring to FIG. 5, a second preferred embodiment of the multiple beam scanning system according to the current invention is illustrated in a top view. The second preferred embodiment is substantially similar to the above described first preferred embodiment, and the identical components are referenced by the same reference numerals. The identically referenced components are not described but their descriptions are incorporated herein from the above. In general, the second preferred embodiment includes two light source units 111 and 113 for each emitting multiple beams. In particular, the light source unit 111 emits independent image-forming light beams 1 and 2, and the light beams 1 and 2 are vertically aligned and both have an incoming angle θ on a polygon mirror surface 115 with respect to a normal line of a reflective image-focusing element 16. Similarly, the light source unit 113 emits independent image-forming light beams 3 and 4, and the light beams 3 and 4 are vertically aligned and both have an incoming angle θ on another polygon mirror surface 115 with respect to a normal line of a reflective image-focusing element 17.

In an alternative embodiment, in order to further increase efficiency of the image formation on intermediate image-forming surfaces, a plurality of light beams is simultaneously used for each of the intermediate image-forming surfaces.

Figure 6A:
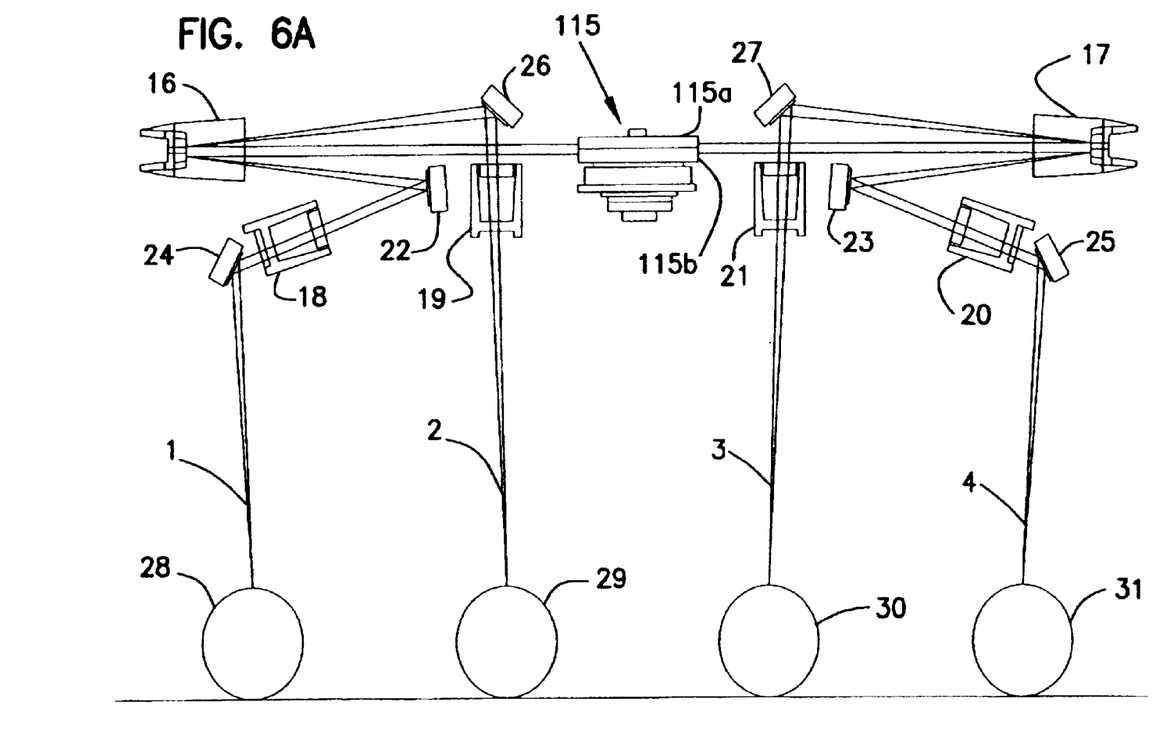
FIG. 6A is an enlarged cross sectional view taken at II—II of the preferred embodiment of the compact multiple beam scanning system as shown in FIG. 5.

Now referring to FIG. 6A, a cross sectional view of the above described second preferred embodiment is taken at a line II—II as illustrated in FIG. 5. The identical components are referenced by the same reference numerals used in FIG.

Figure 6B:
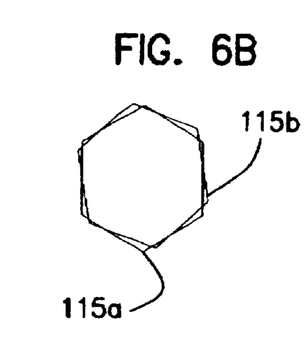
FIG. 6B is a top view illustrating a rotatable polygon mirror of the second preferred embodiment as shown in FIG. 6A.

5, and the identically referenced components are not described but their descriptions are incorporated herein from the above. Unlike the above described first preferred embodiment, a polygon mirror 115 further includes two layers of polygon mirrors 115a and 115b which are juxtaposed in a vertical or sub-scanning direction. These polygon mirror layers 105a and 105b have the same number of identical mirror surfaces and are jointly and fixedly rotated about the same rotational center in the same direction at a predetermined high rotational speed. Although 1 mm between the centers of the two layers maybe theoretically sufficient with an optical error margin for light beams having a diameter of approximately in the order of ten microns, the second preferred embodiment has approximately 3 mm between the centers of the layers in order to maintain sufficient structural rigidity for the high speed rotation. However, the polygon mirror layers 105a and 105b are not perfectly aligned but they are fixedly positioned at a predetermined angle with each other as illustrated in a top view in FIG. 6B. The above described set of two vertically aligned image-forming light beams is reflected by a corresponding one of the angled polygon mirror layers 105a and 105b. Consequently, even though a pair of the vertically aligned light beams has the same emitting angle, the angled polygon mirror layers reflect and scan these light beams at a predetermined delay between the two light beams in the scanning direction.

Figure 7A:
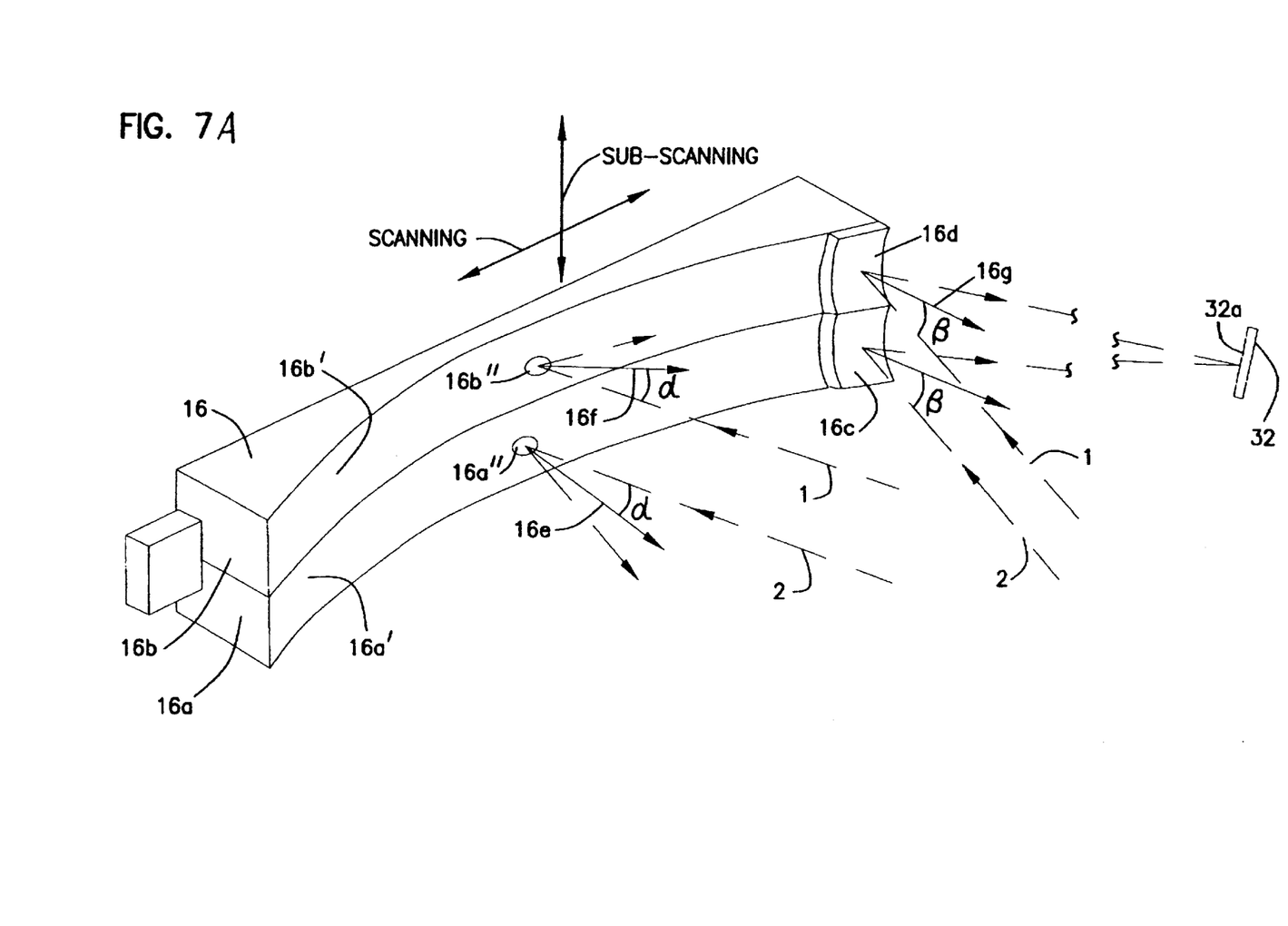
FIG. 7A is a perspective view of one preferred embodiment of the image-focusing element according to the current invention.
Figure 7B:
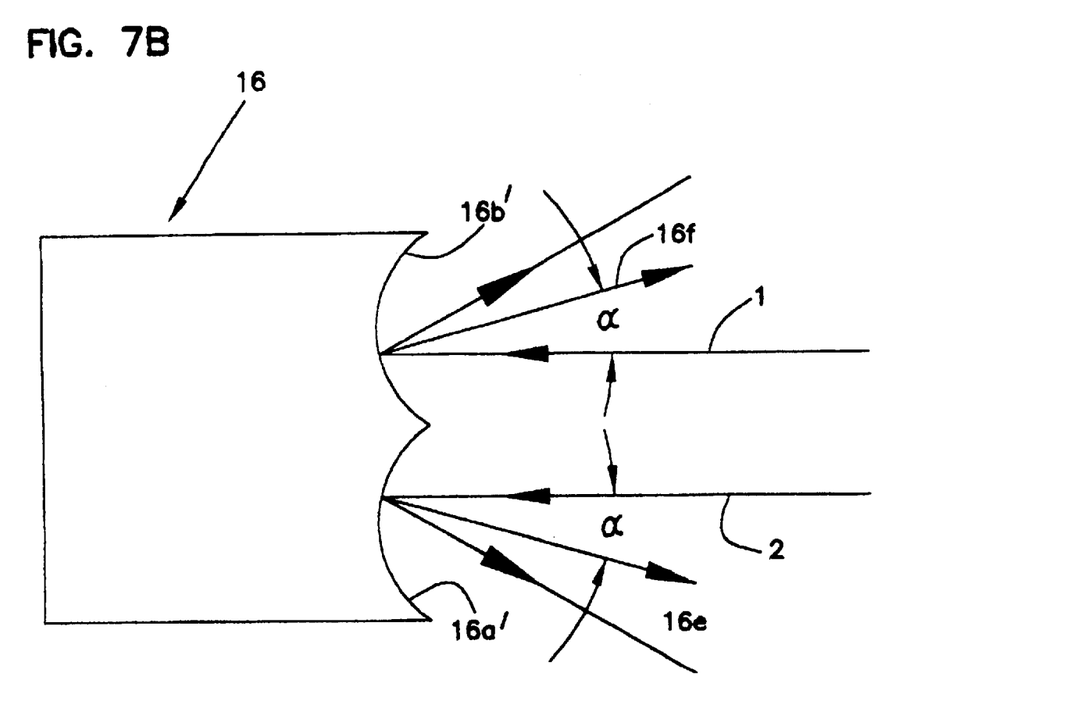
FIG. 7B is a cross sectional view of the preferred embodiment of the image-focusing element as illustrated in FIG. 7A according to the current invention.

Now referring to FIG. 7A, one preferred embodiment of the layered reflective image-focusing element according to the current invention is illustrated in an enlarged perspective view. A reflective image-focusing element 16 includes at least two vertically juxtaposed fθ mirrors 16a and 16b. The centers 16a" and 16b" of the fθ mirrors 16a and 16b are at least 3 mm are a part in a sub-scanning direction to match the distance between the two light beams reflected by the above described polygon mirror. These fθ mirrors 16a and 16b respectively have an elongated curved reflective surface 16a' and 16b' in a scanning direction, and the reflective surfaces 16a' and 16b' are also uniformly concave in a sub-scanning direction. The layered reflective surfaces 16a' and 16b' are located to face a polygon mirror which reflects scanning light beams 1 and 2 towards the reflective surfaces 16a' and 16b' in a scanning direction. Furthermore, a normal line 16f of the upper fθ mirror 16b is tilted upwardly in the sub-scanning direction by an angle a with respect to the incident scanning light beam 1 so that the reflected scanning light beam 1 is directed upwardly by the angle α as also illustrated in FIG. 7B. Similarly, a normal line 16e of the lower fθ mirror 16a is tilted downwardly in the sub-scanning direction by the angle α with respect to the incident scanning light beam 2 so that the reflected scanning light beam is directed downwardly by the angle α as also illustrated in FIG. 7B. As a result, the focused light beams 1 and 2 are diverged and no longer maintain the parallel relation with each other. According to an alternative embodiment, the vertical fθ mirrors 16a and 16b are integrally formed.

Still referring to FIG. 7A, at one end of each of the reflective surfaces 16a' and 16b', fθ mirrors 16a and 16b respectively have second reflective surfaces 16c and 16d. In general, the second reflective surfaces 16c and 16d have a set of fθ characteristics different from those of the reflective surfaces 16a' and 16b'. The second reflective surfaces 16c and 16d are designed to reflect the light beams 1 and 2 in a converging manner to a detection surface 32a of a common photo detector 32 when the light beams 1 and 2 respectively reach the second reflective surfaces 16c and 16d during each scanning cycle. The lower second reflective surface 16c is located on a lower fθ mirror surface 16a', and a normal line of the lower second reflective surface 16c is tilted by an angle β with respect to the incident light beam 2 so that the focused light beam 2 is reflected towards the detection surface 32a. Similarly, the upper second reflective surface 16d is located on an upper fθ mirror surface 16b', and a normal line of the upper second reflective surface 16d is tilted by an angle β with respect to the incident light beam 1 so that the focused light beam 1 is also reflected towards the common detection surface 32a. However, the detection of the light beams is not necessarily contemporaneous if the light beams 1 and 2 are scanned in the above described manners so that they fail to reach the second reflective surfaces 16c and 16d at the same time.

In an alternative embodiment of the above described multi-layered reflective image-focusing element, more than two layers of the fθ mirrors are vertically stacked.

Figure 8:
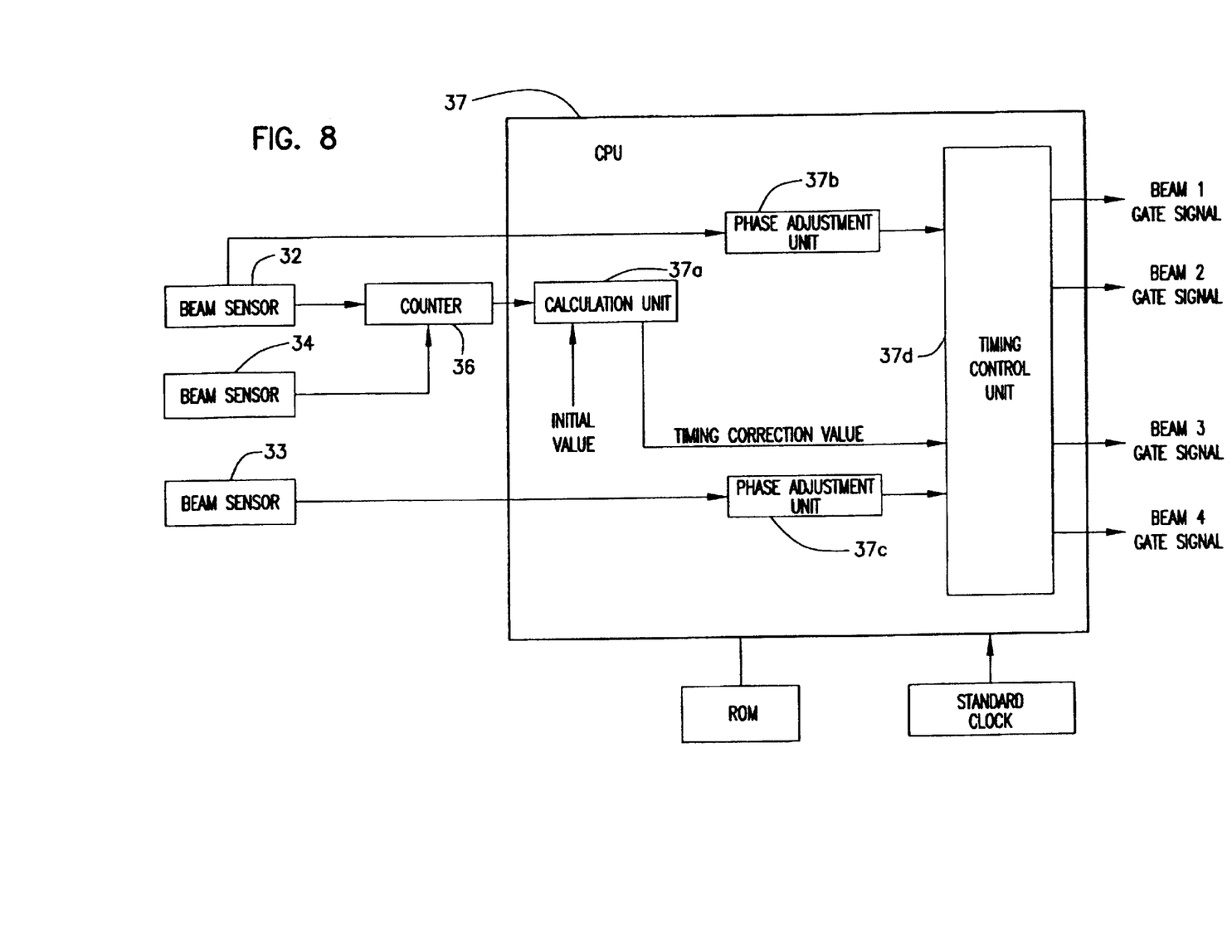
FIG. 8 is a block circuit diagram for adjusting or correcting the onset of a writing process based upon the detection of image-forming light beams at a predetermined location with respect to intermediate image-forming surfaces.

Now referring to FIG. 8, a block diagram illustrates a sub-system for adjusting a writing onset timing of multiple beams. In general, beam sensors or photo detectors 32, 33 and 34 detect an arrival of the corresponding one of the multiple beams. In particular, a pair of the beam sensors 32 and 34 each generates an onset signal and an ending signal during a scanning cycle. Based upon these signals and a clock signal from a counter 36, a time length of a scanning cycle is determined. A calculation unit 37a compares the above measured time length to a standard initial value to determine a timing correction value or an adjustment amount and outputs the timing correction value to a timing control unit 37d. The beam sensors 32 and 33 also output their detection signals to the timing control unit 37d via phase adjustment units 37b and 37c. Based upon the above described signals or values, the timing control unit 37d generates adjusted beam gate signals for controlling an onset of a writing process on each of intermediate image-forming surfaces.

Figure 9:
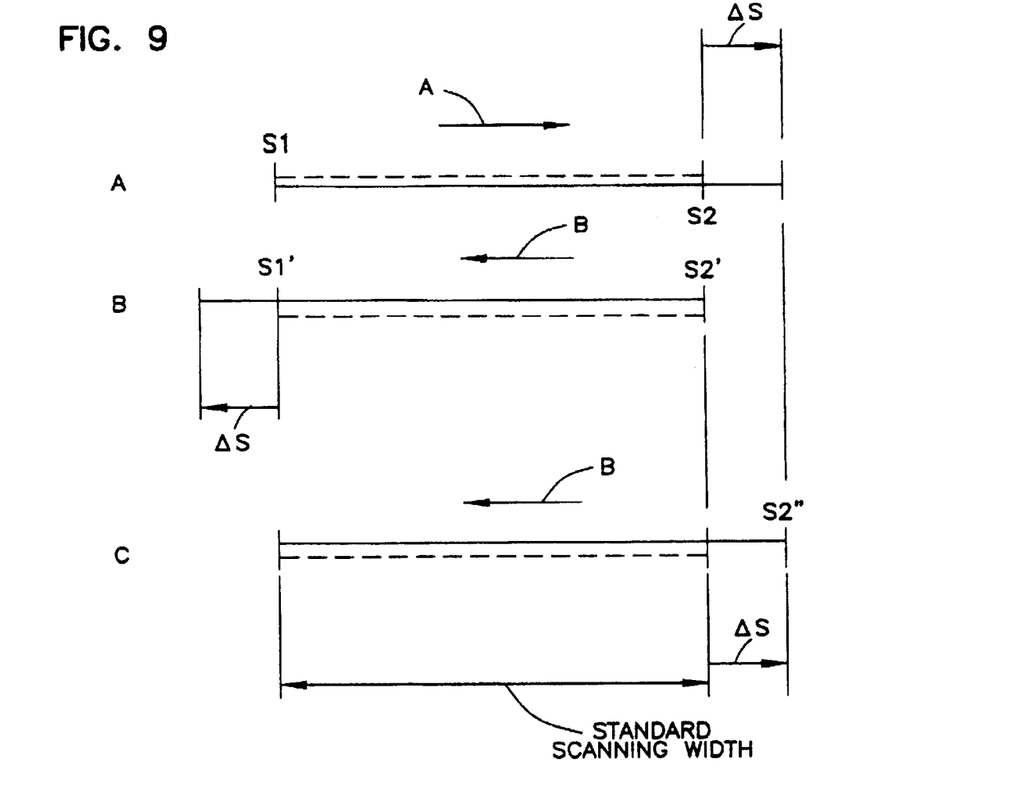
FIG. 9 is a timing diagram for illustrating a correctional process for adjusting the onset of a writing process based upon the detection of two image-forming light beams.
Figure 10:
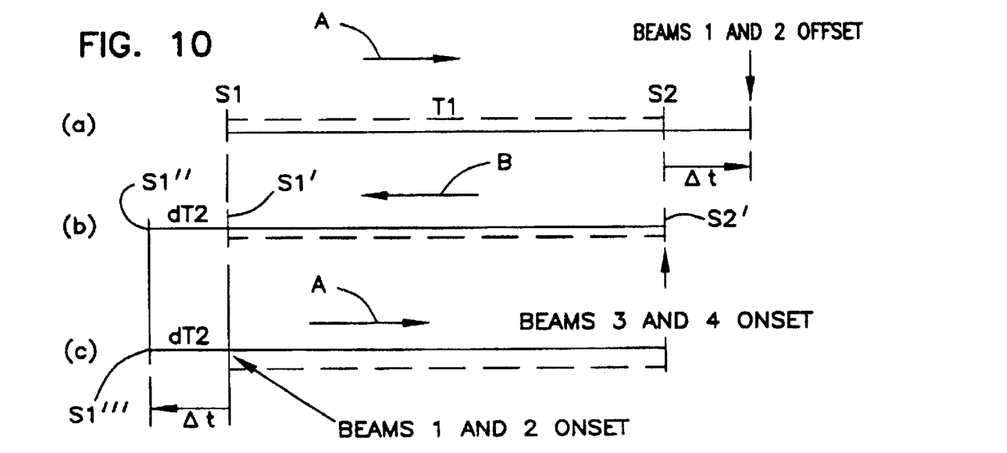
FIG. 10 is another timing diagram for illustrating a correctional process for adjusting the onset of a writing process based upon the detection of two image-forming light beams.

FIGS. 9 and 10 generally illustrate the above described timing adjustments of the writing onset on an intermediate image-forming surface. In particular, referring to FIG. 9A, S1 indicates an onset of a writing process by scanning beams 1 and 2 in a scanning direction A. S2 is a standard end of the same writing process by the scanning beams 1 and 2 while the writing process actually ends with a time delay ΔS. Similarly, now referring to FIG. 9B, S2' indicates an onset of a writing process by scanning beams 3 and 4 in an opposite scanning direction B. S1' is a standard end of the same writing process by the scanning beams 3 and 4 while the writing process actually ends with a time delay ΔS past a time S1'. The above described time delay ΔS is caused by factors such as thermal expansion of mechanical or optical components or a wavelength change in the laser light beam. Assuming the time delays ΔS are identical between the above sets of the light beams, the onset of the writing process by the light beams 3 and 4 are adjusted by ΔS, and the writing process now starts at S2" as illustrated in FIG. 9C. As a result, the two sets of the light beams have the substantially same time length for the writing process. Tie substantially adjusted writing process enables the portions of the image on intermediate image-forming surfaces to be better aligned with each other when these images are placed together on an image-carrying medium such as paper.

Now referring to FIGS. 10A, as an alternative method for adjusting the onset timing, S1 indicates an onset of a writing process by scanning beams 1 and 2 in a scanning direction A. S2 is a standard end of the same writing process by the scanning beams 1 and 2 while the writing process actually ends with a time delay Δt. Similarly, now referring to FIG.

10B, S2' indicates an onset of a writing process by scanning beams 3 and 4 in an opposite scanning direction B. S1' is a standard end of the same writing process by the scanning beams 3 and 4 while the writing process actually ends at S1" with a time delay dt2 past a time S1'. The above described time delay Δt is caused by factors such as thermal expansion of mechanical or optical components or a wavelength change in the laser light bears Assuming the time delays Δt is identical to dt2, the onset of the writing process by the light beams 1 and 2 are adjusted by Δt, and the writing process now starts at S1'" as illustrated in FIG. 10C.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of scanning a plurality of image-forming light beam respectively onto one of predetermined temporary image-forming surfaces via at least a rotatable image-reflecting surface and an image-focusing element, comprising the following the steps of:
   a) emitting the plurality of the image-forming light beams towards the common rotatable image-reflecting surface;
   b) rotating the image-reflecting surface so as to scan the image-forming light beams in a predetermined scanning direction as they are reflected towards the image-focusing element;
   b') widening a distance between the image forming light beams via the image-focusing element;
   c) forming independent portions of an image after said step b' as the widened image-forming light beams are projected towards the image-reflecting surface in the scanning direction; and
   d) directing the image-forming light beams which now form the image towards the respective one of the temporary image-forming surfaces in the scanning direction.

2. The method of scanning a plurality of image-forming light beams according to claim 1 farther comprising an additional step of further adjusting the image via a lens.

3. The method of scanning a plurality of image-forming light beams according to claim 1 wherein the image forming light beams form the portions of the image based upon color components of the image.

4. The method of scanning a plurality of image-forming light beams according to claim 3 wherein the color components include cyan, magenta, yellow and black.

5. The method of scanning a plurality of image-forming light beams according to claim 1 wherein the plurality of the image forming light beams include multiple sets of the image-forming light beams, each of the sets of the image-forming light beams being emitted towards the common rotatable image-reflecting surface.

6. The method of scanning a plurality of image-forming light beams according to claim 1 wherein each of the image-forming light beams is reflected off the image-focusing element at a predetermined reflection angle with respect to an incident angle in said forming step.

7. The method of scanning a plurality of image-forming light beams according to claim 1 wherein the image-forming light beams are emitted towards the image-reflecting surface at an identical incident angle in said emitting step.

8. The method of scanning a plurality of image-forming light beams according to claim 7 wherein each of the image-forming light beams is reflected off the image-reflecting surface at a predetermined reflection angle in said rotating step.

9. The method of scanning a plurality of image-forming light beams according to claim 1 wherein each of the image-forming light beams is emitted towards the image-reflecting surface at a predetermined incident angle in said emitting step.

10. The method of scanning a plurality of image-forming light beams according to claim 1 further comprising an additional step of independently detecting an arrival of each of the image-forming light beams at a predetermined location in the scanning direction.

11. The method of scanning a plurality of image-forming light beams according to claim 10 further comprising an additional step of adjusting an onset timing of forming the image on the temporary image-forming surfaces based upon said independently detecting step.

12. A method of simultaneously scanning a plurality of image-forming light beams for forming a common image via a rotatable narrow polygon mirror and a layered image-focusing mirror, comprising the following steps of:
   a) juxtaposing a predetermined number of image-focusing mirrors in layers to form the layered image-focusing mirror;
   b) simultaneously emitting the plurality of the image-forming light beams with a predetermined substantially short distance between the image-forming light beams towards the rotatable narrow polygon mirror;
   c) rotating the rotable narrow polygon mirror for scanning each of the image-forming light beams in a predetermined scanning direction;
   c') reflecting the image-forming light beams off the layered image-focusing mirror to widen a distance between the image-forming light beams; and
   d) simultaneously forming independent portions of an image after said rotating step as the image-forming light beams are reflected off a corresponding one of the layers of the layered image-focusing mirror.

13. The method of simultaneously scanning a plurality of image-forming light beams according to claim 12 wherein the independent portions of the image are formed in accordance with a predetermined fθ characteristics in said simultaneously forming step.

14. The method of simultaneously scanning a plurality of image-forming light beams according to claim 13 wherein the image-forming light beams in said simultaneously forming step is reflected at a predetermined angle with respect to a normal line of each of the layers in a sub-scanning direction which is perpendicular to the scanning direction.

15. The method of simultaneously scanning a plurality of image-forming light beams according to claim 12 wherein the image-forming light beams are emitted towards the rotatable narrow polygon mirror at an identical incident angle in said simultaneously emitting step.

16. The method of simultaneously scanning a plurality of image-forming light beams according to claim 15 wherein each of the image-forming light beams is reflected off the rotatable narrow polygon mirror at a predetermined reflection angle in said rotating step.

17. The method of simultaneously scanning a plurality of image-forming light beams according to claim 12 wherein each of the image-forming light beams is emitted towards the rotatable narrow polygon mirror at a predetermined incident angle in said simultaneously emitting step.

18. The method of simultaneously scanning a plurality of image-forming light beams according to claim 12 further comprising an additional step of independently detecting an arrival of each of the image-forming light beams at a predetermined location in the scanning direction.

19. The method of simultaneously scanning a plurality of image-forming light beams according to claim 18 further comprising an additional step of adjusting an onset timing of forming the image on a temporary image forming surface based upon said independently detecting step.

20. An optical scanning system for scanning a plurality of image-forming light beams, comprising:
a plurality of light sources for emitting image-forming light beams;
a rotatable image-reflecting unit having image-reflecting surfaces located near said light sources for scanning the image-forming light beams in a predetermined scanning direction as the image-forming light beams are reflected off one of said reflecting surfaces;
an image-focusing element located near said rotatable image-reflecting unit for simultaneously forming independent portions of an image in response to the image-forming light beams scanned by said rotatable image-reflecting unit and received by said image-focusing element, said image-focusing element widening a distance between the image-forming light beams and leading the image-forming light beams having the widened distance in the scanning direction; and
a set of optical directing elements located between said rotatable image-reflecting unit and said image-focusing element for directing the image-forming light beams which now forms the image respectively in a predetermined direction.

21. The optical scanning system for scanning a plurality of image-forming light beams according to claim 20 wherein said image-focusing element further comprises a predetermined number of layers of juxtaposed image focusing mirrors, the image-forming light beams each being reflected off by a corresponding one of said juxtaposed image focusing mirrors.

22. The optical scanning system for scanning a plurality of image-forming light beams according to claim 20 further comprising a correctional lens located near said optical directing elements for adjusting the image.

23. The optical scanning system for scanning a plurality of image-forming light beams according to claim 20 wherein said light sources emit the image-forming light beams for forming the portions of the image based upon color components of the image.

24. The optical scanning system for scanning a plurality of image-forming light beams according to claim 23 wherein the color components include cyan, magenta, yellow and black.

25. The optical scanning system for scanning a plurality of image-forming light beams according to claim 20 wherein said light sources emit multiple sets of the image-forming light beams and further comprising an additional image-focusing element for each of the sets of the image-forming light beams.

26. The optical scanning system for scanning a plurality of image-forming light beams according to claim 20 wherein said image-focusing element reflects each of the image-forming light beams at a predetermined reflection angle with respect to an incident angle.

27. The optical scanning system for scanning a plurality of image-forming light beams according to claim 20 wherein said light sources emit the image-forming light beams towards said rotatable image-reflecting unit at an identical incident angle.

28. The optical scanning system for scanning a plurality of image-forming light beams according to claim 27 wherein said image-reflecting surfaces have a predetermined number of layers, said layers being vertically juxtaposed and angled with each other.

29. The optical scanning system for scanning a plurality of image-forming light beams according to claim 20 wherein said light sources emit each of the image-forming light beams towards the image-reflecting surface at a predetermined incident angle.

30. The optical scanning system for scanning a plurality of image-forming light beams according to claim 20 further comprising a beam detector located near said image-focusing element for independently detecting an arrival of each of the image forming light beams at a predetermined location in the scanning direction.

31. The optical scanning system for scanning a plurality of image-forming light beams according to claim 30 further comprising an onset control connected to said beam detector for adjusting an onset timing of forming the image on temporary image-forming surfaces.

32. An image-forming device for a plurality of image-forming light beams to form a common image, comprising:
a predetermined number of image-focusing mirrors juxtaposed in layers, each of said image-focusing mirrors having a first reflective surface and independently forming a portion of the common image as a corresponding one of the image-forming light beams is scanned in a scanning direction and is reflected off said first reflective surface to widen a distance between the image forming light beams, the image-forming light beams being initially emitted with a predetermined substantially short distance between the image-forming light beams.

33. The image-forming device for a plurality of image-forming light beams according to claim 32 wherein said first reflective surface has a predetermined fθ characteristics.

34. The image-forming device for a plurality of image-forming light beams according to claim 32 wherein said first reflective surface reflects the image-forming light beams at a predetermined angle with respect to a normal line of the first reflective surface in a sub-scanning direction which is perpendicular to the scanning direction.

35. The image-forming device for a plurality of image-forming light beams according to claim 32 wherein said first reflective surface is approximately less than 3 millimeters in size in a sub-scanning direction which is perpendicular to the scanning direction.

36. The image-forming device for a plurality of image-forming light beams according to claim 32 wherein each of said image-focusing mirrors has a second reflective surface.

37. The image-forming device for a plurality of image-forming light beams according to claim 36 wherein said second reflective surface is located at one end of said first reflective surface.

38. The image-forming device for a plurality of image-forming light beams according to claim 32 wherein the image-focusing mirrors each have a spherical mirror surface.

39. The image-forming device for a plurality of image-forming light beams according to claim 32 wherein the image-focusing mirrors each have an aspherical mirror surface.

* * * * *